(12) United States Patent
Chang et al.

(10) Patent No.: US 8,908,123 B2
(45) Date of Patent: Dec. 9, 2014

(54) DIRECT-LIGHT TYPE BACKLIGHT MODULE AND LIQUID CRYSTAL DISPLAY

(75) Inventors: Kuang-Yao Chang, Guandong (CN); Hongye Liu, Guandong (CN); Panpan Fu, Guandong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 176 days.

(21) Appl. No.: 13/518,872

(22) PCT Filed: Apr. 20, 2012

(86) PCT No.: PCT/CN2012/074421
§ 371 (c)(1),
(2), (4) Date: Jun. 22, 2012

(87) PCT Pub. No.: WO2013/155698
PCT Pub. Date: Oct. 24, 2013

(65) Prior Publication Data
US 2013/0271694 A1    Oct. 17, 2013

(30) Foreign Application Priority Data
Apr. 16, 2012  (CN) .......................... 2012 1 0111007

(51) Int. Cl.
G02F 1/1335  (2006.01)
G02F 1/1333  (2006.01)
G09F 13/04   (2006.01)
F21V 7/04    (2006.01)

(52) U.S. Cl.
USPC .............. 349/64; 349/58; 349/112; 362/97.2; 362/632

(58) Field of Classification Search
None
See application file for complete search history.

(56) References Cited

U.S. PATENT DOCUMENTS 7,163,328 B2 * 1/2007 Chang et al. ................... 362/561
2012/0063122 A1 * 3/2012 Yokota et al. ................. 362/97.2

* cited by examiner

*Primary Examiner* — Bumsuk Won
*Assistant Examiner* — Angela Davison
(74) *Attorney, Agent, or Firm* — Andrew C. Cheng

(57) ABSTRACT

A direct-light type backlight module and a liquid crystal display (LCD) are proposed. The direct-light type backlight module includes a base frame, a light source, a diffuser plate, and a plurality of support pins. The light source is disposed on the base frame. The diffuser plate is disposed on the light source. The plurality of support pins are disposed on the base frame and support the diffuser plate. At least one of the plurality of support pins is made of first transparent materials, or is made of is made of top and bottom connected second transparent materials and opaque materials. Through the abovementioned method, support pin shadow mura could be successfully prevented, and a backlight effect and a display effect could be effectively enhanced when light emitted by the light source shines on the at least one of the plurality of support pins.

5 Claims, 4 Drawing Sheets

DIRECT-LIGHT TYPE BACKLIGHT MODULE AND LIQUID CRYSTAL DISPLAY

BACKGROUND OF THE INVENTION

1. Field of the Invention

The present invention relates to a liquid crystal display (LCD) technology, and mare particularly, to a direct-light type backlight module and an LCD.

2. Description of the Prior Art

Cold cathode fluorescent lamps (CCFLs) used to be backlight sources of an LCD. However, LEDs have been substituted for most CCFLs and become the mainstream light sources on the market. This is because LEDs have advantages of becoming flatter, consuming lower power, and containing no mercury. Moreover, the LEDs have been used in direct-light type backlight modules gradually.

Low-cost direct-light type backlight modules use LEDs mounted by surface mount technology (SMT) and use a secondary optical lens as well. In such LCD technology, a type that maximum luminous intensity occurs at a wide viewing angle replaces the lambertian scattering light pattern (LEDs emit light). Referring to FIG. 1. FIG. 1 shows a diagram of refraction of light emitted by an LED in the secondary optical lens 102 in a conventional direct-light type backlight. A light source 101 is an LED and is disposed under the secondary optical lens 102. The center of the secondary optical lens 102 is concave. The concave center could deflect light emitted by the light source 101 at a frontal viewing angle to emitting light at a wide angle. Therefore, the formed light pattern is transformed from the lambertian scattering light pattern into the wide angle scattering light pattern. As shown in FIG. 2 and FIG. 3, FIG. 2 is a coordinate diagram showing a relation between brightness and viewing angles in the lambertian scattering light pattern formed when an LED light source without the secondary optical lens emits light. In FIG. 2, x-coordinate indicates viewing angles, and y-coordinate indicates brightness of light. FIG. 3 is a coordinate diagram showing the relation between relative brightness and viewing angles of the wide viewing angle light pattern shown in FIG. 1. In FIG. 3, x-coordinate indicates relative brightness of light, and y-coordinate indicates viewing angles. As can be seen, the wide viewing angle light pattern combining with the secondary optical lens could reduce the number of LEDs, which helps reduce production costs.

However, a serious technical problem would occur when the wide viewing angle light pattern is realized in the direct-light type backlight module. Whenever light emitted at a wide viewing angle usually shines on support pins which support a diffuser plate, a shadow is produced. Referring to FIG. 4, FIG. 4 shows a location relationship diagram of a support pin 402 and a light source in a conventional direct-light type backlight module. As shown in FIG. 4, due to a shielding effect of the support pin 402, a luminous domain 403 is formed on the upper part of the support pin 402, and a shadow is formed at one side of the support pin 402 against light which is emitted by an LED 401 (the light source) and shines on the support pin 402. In other words, an emitting surface of the direct-light type backlight module would produce a stripe of shadow on one side of the support pin 402 against the LED 401, which is called "support pin shadow mura." Referring to FIG. 5, FIG. 5 shows a schematic diagram of support pin shadow mura generated when light is blocked by the support pin 402 in FIG. 4. As shown in FIG. 5, a domain 403' represents the shadow after light emitted by the LED 401 is blocked by the upper part of the support pin 402. As can be seen, an emitting effect of the direct-light type backlight module is affected.

Therefore, there is a need for a direct-light type backlight module for preventing support pin shadow mura occurring in the conventional technology.

SUMMARY OF THE INVENTION

An object of the present invention is to provide a direct-light type backlight module and an LCD capable of preventing support pin shadow mura and enhancing a backlight effect and a display effect on the premise of low production costs.

According to the present invention, a liquid crystal display (LCD) comprises: a base frame; a light source, disposed on the base frame; a diffuser plate, disposed on the light source; a plurality of support pins disposed on the base frame, for supporting the diffuser plate, at least one of the plurality of support pins made of first transparent materials, or made of second transparent material and opaque material. A length of the second transparent material is obtained by a function of:

$$D \geq h - \frac{S}{\tan \theta},$$

where D indicates the length of the second transparent material, h indicates a length of the at least one of the plurality of support pins, S indicates a distance between the at least one of the plurality of support pins and the light source closest to the at least one of the plurality of support pins, θ indicates an angle of incidence of a determined light beam emitted by the light source with respect to the at least one of the plurality of support pins when the determined light beam is transmitted into the at least one of the plurality of support pins, and an intensity of the determined light beam is one tenth of a maximum luminous intensity from the light source;

the longer a diameter of the at least one of the plurality of support pins is, the higher transmittance of the first or the second transparent material becomes.

In one aspect of the present invention, the light source is a light emitting diode for scattering light as a batwing-like pattern.

In another aspect of the present invention, when the diameter of the first or the second transparent material is equal to 1 mm, a total light transmittance of the first or the second transparent material is higher than 5%.

In another aspect of the present invention, at least another one of the plurality of support pins is made of opaque material and complies with $$\frac{S}{\tan \theta} \geq h.$$

where h indicates a length of the at least another one of the plurality of support pins, S indicates a distance between the at least another one of the plurality of support pins and the light source closest to the at least another one of the plurality of support pins, θ indicates an angle of incidence of a determined light beam emitted by the light source with respect to the at least another one of the plurality of support pins when the determined light beam is transmitted into the at least another one of the plurality of support pins, and an intensity of the determined light beam is one tenth of the maximum luminous intensity from the light source.

In another aspect of the present invention, the LCD further comprises a reflector sheet disposed between the light source and the base frame and an optical film disposed on the diffuser plate.

According to the present invention, a direct-light type backlight module, comprises a base frame; a light source, disposed on the base frame; a diffuser plate, disposed on the light source; a plurality of support pins disposed on the base frame, for supporting the diffuser plate, a distance S between the plurality of support pins closest to the light source and the light source having to satisfy a formula as follows: S≥h*tan θ; where h indicates a length of the plurality of support pins closest to the light source, θ indicates an angle of incidence of a determined light beam emitted by the light source with respect to the plurality of support pins when the determined light beam is transmitted into the plurality of support pins, and an intensity of the determined light beam is one tenth of a maximum luminous intensity from the light source.

In one aspect of the present invention, a length of the second transparent material is obtained by a function of:

$$D \geq h - \frac{S}{\tan \theta},$$

where D indicates the length of the second transparent material, h indicates a length of the at least one of the plurality of support pins, S indicates a distance between the at least one of the plurality of support pins and the light source closest to the at least one of the plurality of support pins, θ indicates an angle of incidence of a determined light beam emitted by the light source with respect to the at least one of the plurality of support pins when the determined light beam is transmitted into the at least one of the plurality of support pins, and an intensity of the determined light beam is one tenth of a maximum luminous intensity from the light source.

In another aspect of the present invention, the light source is an LED for scattering light as a batwing-like pattern.

In another aspect of the present invention, the longer a diameter of the at least one of the plurality of support pins is, the higher a transmittance of the first or the second transparent material becomes.

In another aspect of the present invention, when the diameter of the first or the second transparent material is equal to 1 mm, a total light transmittance of the first or the second transparent material is higher than 5%.

In another aspect of the present invention, at least another one of the plurality of support pins is made of opaque material and complies with $$\frac{S}{\tan \theta} \geq h,$$

where h indicates a length of the at least another one of the plurality of support pins, S indicates a distance between the at least another one of the plurality of support pins and the light source closest to the at least another one of the plurality of support pins, θ indicates an angle of incidence of a determined light beam emitted by the light source with respect to the at least another one of the plurality of support pins when the determined light beam is transmitted into the at least another one of the plurality of support pins, and an intensity of the determined light beam is one tenth of the maximum luminous intensity from the light source.

In another aspect of the present invention, the direct-light type backlight module further comprises a reflector sheet disposed between the light source and the base frame and an optical film disposed on the diffuser plate.

According to the present, a direct-light type backlight module, comprises a base frame: a light source, disposed on the base frame; a diffuser plate, disposed on the light source; a plurality of support pins disposed on the base frame, for supporting the diffuser plate, a distance S between the plurality of support pins closest to the light source and the light source having to satisfy a formula as follows: S≥h*tan θ; where h indicates a length of the plurality of support pins closest to the light source, θ indicates an angle of incidence of a determined light beam emitted by the light source with respect to the plurality of support pins when the determined light beam is transmitted into the plurality of support pins, and an intensity of the determined light beam is one tenth of a maximum luminous intensity from the light source.

In one aspect of the present invention, the light source is an LED for scattering light as a batwing-like pattern.

In another aspect of the present invention, the plurality of support pins are made of transparent materials.

In another aspect of the present invention, the plurality of support pins are made of opaque materials.

In another aspect of the present invention, some of the plurality or support pins are made of opaque materials, and the other of the plurality of support pins are made of transparent materials.

In another aspect of the present invention, the direct-light type backlight module further comprises a reflector sheet disposed between the light source and the base frame and an optical film disposed on the diffuser plate.

The present invention has advantages of preventing support pin shadow mum and enhancing the backlight effect and the display effect. Differing from the conventional technology, the present invention has features as follows: On one hand, at least one support pin is made of first transparent materials, or is made of top and bottom connected second transparent materials and opaque materials. Thus, light emitted by a light source could pass through the first transparent materials or the second transparent materials when shining on the at least one support pin. On the other hands, the distance S between the light source and the support pin closest to the light source is larger than a predetermined distance so as to prevent support pin shadow mura and to enhance the backlight effect and the display effect.

DETAILED DESCRIPTION OF THE PREFERRED EMBODIMENTS

Figure 6:
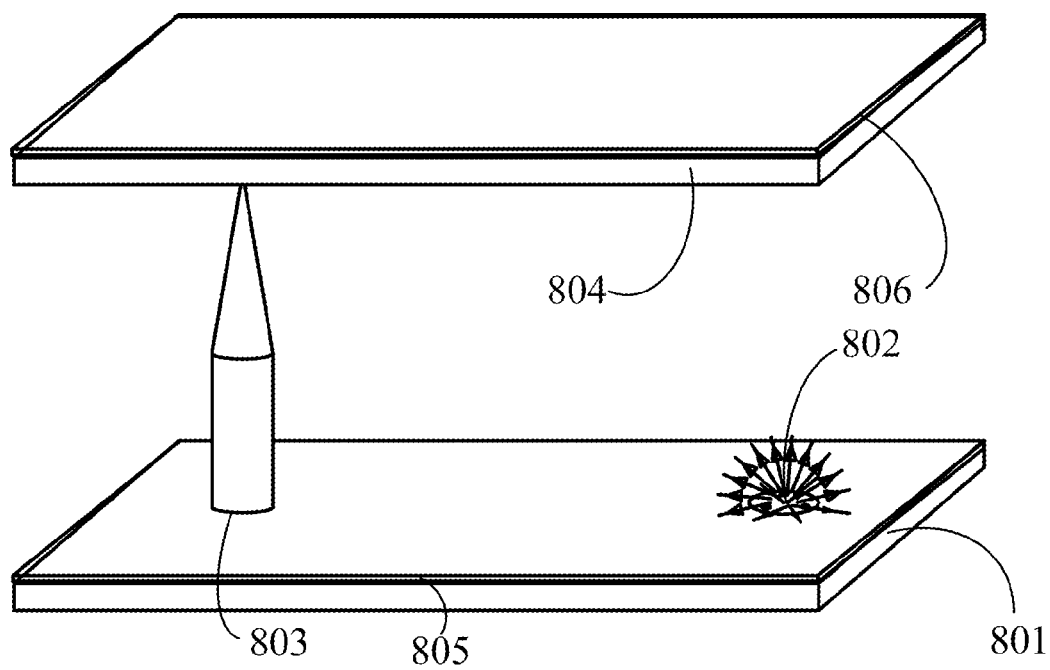
FIG. 6 is a structure diagram of a direct-light type backlight module according to a preferred embodiment of the present invention.

Referring to FIG. 6, FIG. 6 is a structure diagram of a direct-light type backlight module according to a preferred embodiment of the present invention. As shown in FIG. 6, the direct-light type backlight module comprises a base frame 801, a light source 802, a support pin 803, and a diffuser plate 804. It is notified that a plurality of support pins 803 are used though only one support pin 803 is shown in FIG. 6.

The light source 802 is disposed on the base frame 801. The diffuser plate 804 is disposed on the light source 802 and used for diffusing light emitted by the light source 802 uniformly. The support pin 803 is disposed on the base frame 801 and used for supporting the diffuser plate 804.

For better understanding two preferred embodiments of the present invention, M and N, the relation between the support pin 803 and support pin shadow mura and the relation between the support pin 803 and the light source 802 are analyzed in the following.

Figure 7:
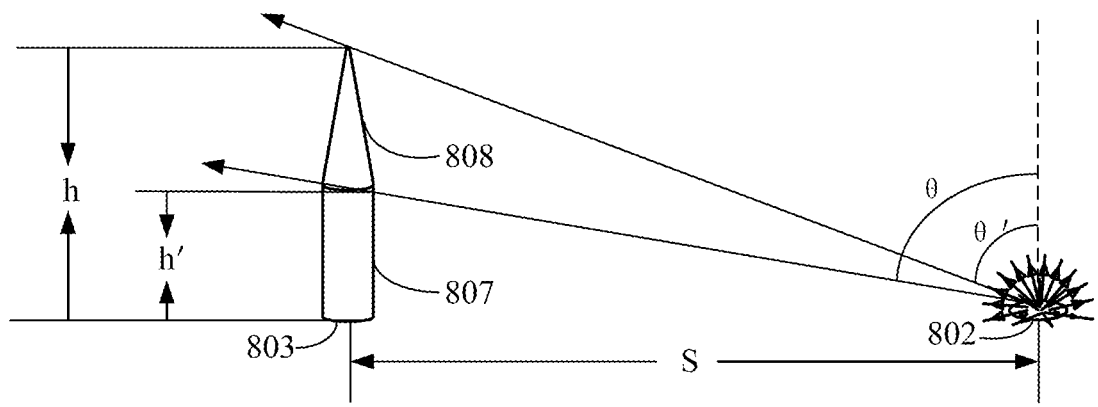
FIG. 7 is a diagram showing an angle of incidence formed when a light beam emitted by the light source transmits into the support pin shown in FIG. 6.

Referring to FIG. 7, FIG. 7 is a diagram showing an angle of incidence formed when a light beam emitted by the light source 802 transmits into the support pin 803 shown in FIG. 6. The angle of incidence comprises two angles. Angle θ' and Angle θ. Angle θ' is defined when light intensity is maximum luminous intensity; Angle θ is defined when light intensity is one tenth of maximum luminous intensity. Experiments are conducted based on the two angles of incidence. The distance between the light source 802 and the support pin 803 is defined as Distance S. The length of the support pin 803 is defined as Length h. One part of the support pin 807 is not shined by light with two different light intensities. The length of this part of the support pin 807 is defined as Length h'.

Figure 1:
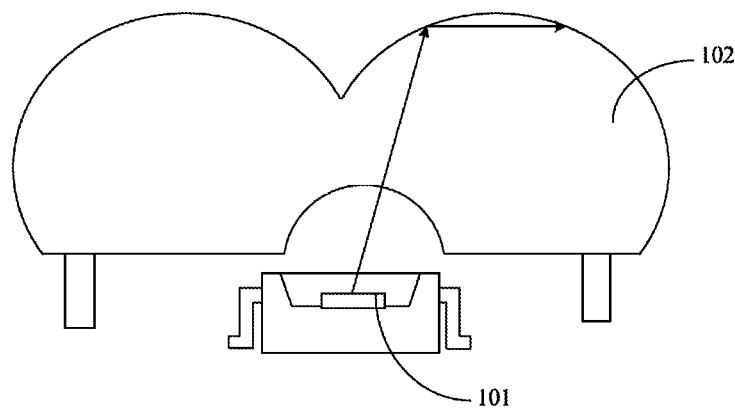
FIG. 1 shows a diagram of refraction of light emitted by an LED in the secondary optical lens in a conventional direct-light type backlight.
Figure 2:
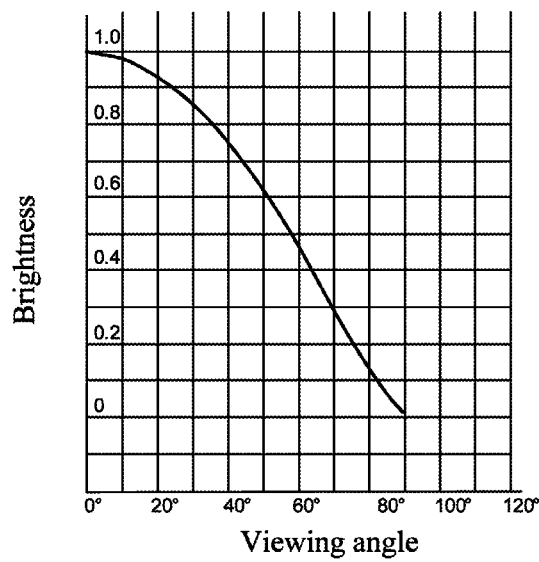
FIG. 2 is a coordinate diagram showing a relation between brightness and viewing angles in the lambertian scattering light pattern formed when an LED light source without the secondary optical lens emits light.
Figure 3:
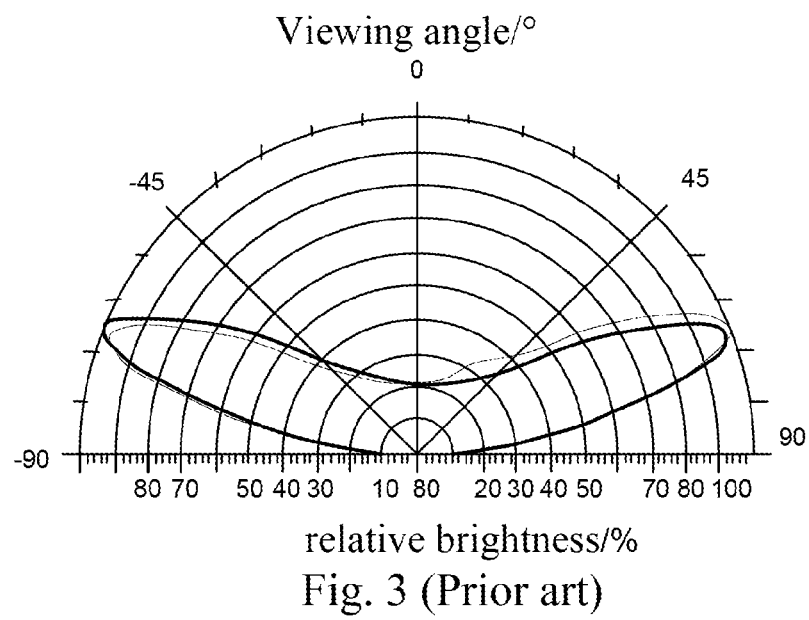
FIG. 3 is a coordinate diagram showing the relation between relative brightness and viewing angles of the wide viewing angle light pattern shown in FIG. 1.
Figure 4:
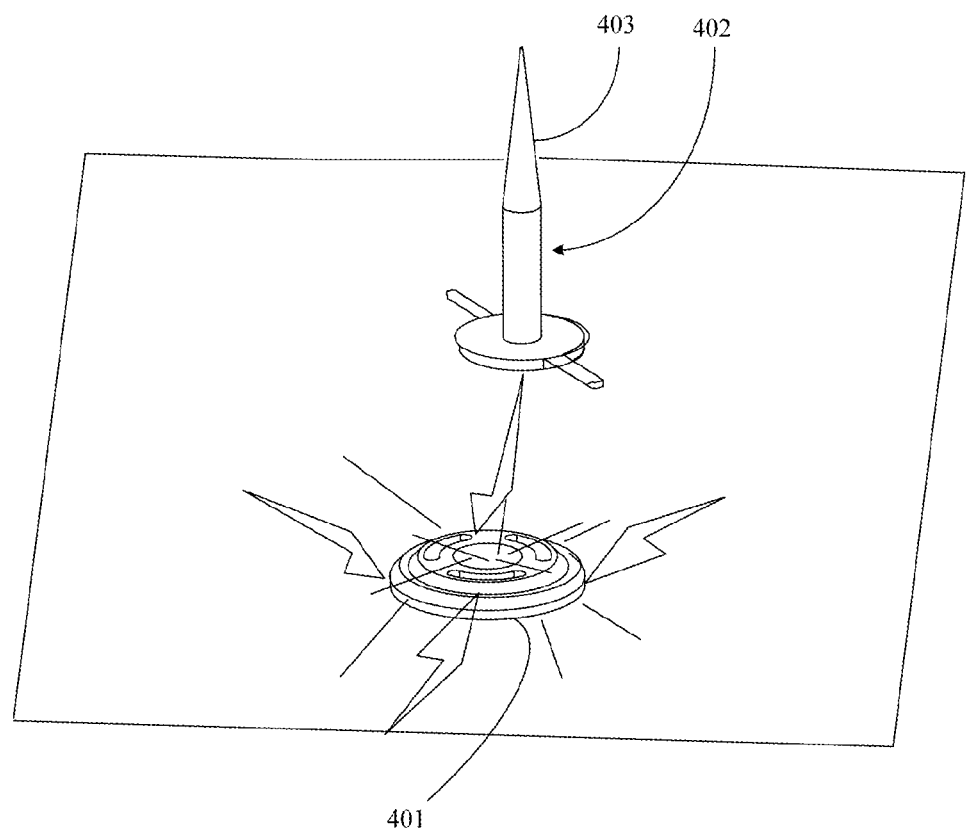
FIG. 4 shows a location relationship diagram of a support pin and a light source in a conventional direct-light type backlight module.
Figure 5:
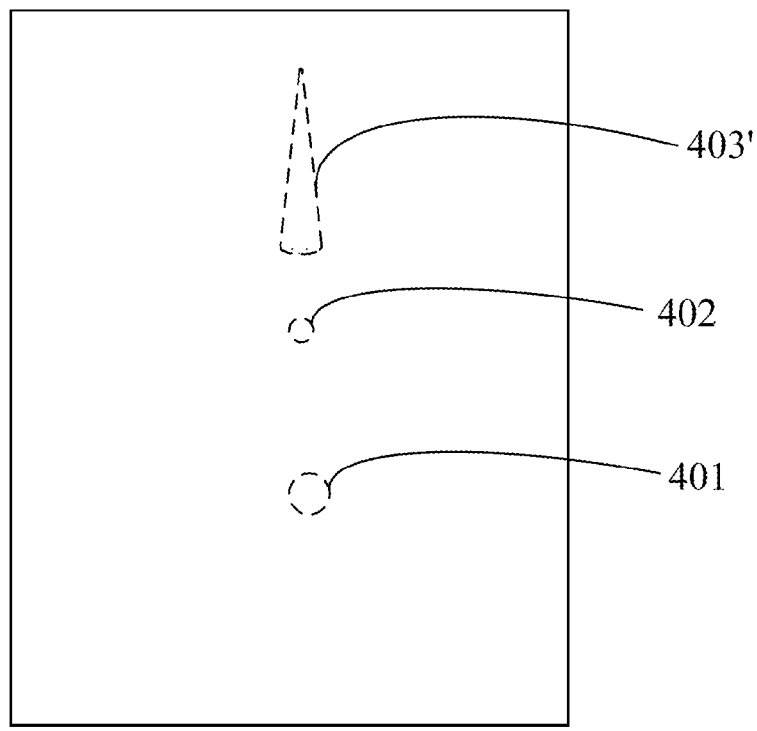
FIG. 5 shows a schematic diagram of support pin shadow mura generated when light is blocked by the support pin in FIG. 4.

Results of the experiments are as follows: No luminous domain 808 would be formed on the support pin 803 (i.e., no support pin shadow mura occurs) when the light beam of the two kinds of light intensities does not transmitted into on the support pin 803. The luminous domain 808 would be formed on the support pin 803 when h−h'≥0 stands. The length of the luminous domain 808 is (h−h'), as shown in FIG. 7. Therefore, support pin shadow mura would occur on an emitting surface of the backlight module. Support pin shadow mura could be referred to the description about FIG. 5.

Figure 8:
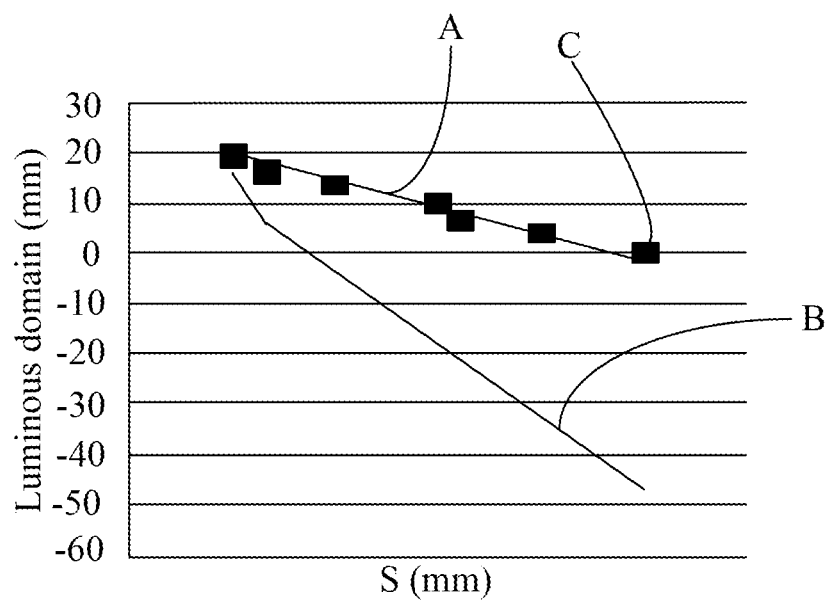
FIG. 8 shows a coordinate diagram of theoretical data and experimental data derived from FIG. 7.

As shown in FIG. 8, FIG. 8 shows a coordinate diagram of theoretical data and experimental data derived from the function diagram shown in FIG. 7. The x-coordinate indicates the length of the luminous domain 808. The luminous domain 808 is formed when light from the light source 802 shines on the support pin 803. Thus, the length of the luminous domain 808 is (h−h'). The y-coordinate indicates the distance between the support pin 803 and the light source 802. When the angle of incidence responds to one tenth of the maximum luminous intensity from the light source 802, the theoretical data of the relation between the calculated length of the luminous domain 808 (h−h') and distance S is shown in an A line in FIG. 8. When the angle of incidence responds to the maximum luminous intensity from the light source 802, the theoretical data of the relation between the calculated length of the luminous domain 808 (h−h') and the distance S is shown in a B line in FIG. 8. In addition, the measured data of the relation between the experimentally measured length of the luminous domain 808 (h−h') and the distance S is shown in C data points in FIG. 8. As shown in FIG. 8, the A line almost matches the C data points. That is, the theoretical data or the relation between the calculated length of the luminous domain 808 (h−h') and the distance S almost matches the experimentally measured data when the angle of incidence responds to one tenth of the maximum luminous intensity from the light source 802.

Therefore, the criterion of the present invention is that the light intensity from the light source 802 is one tenth of the maximum luminous intensity. Any light beam transmitted into the support pin 803 surpasses or equals the criterion is defined as a light beam which causes support pin shadow mura. As for a light beam transmitted into the support pin 803 does not surpass or equal the criterion is defined as a light beam which does not cause support pin shadow mura. Based on the criterion, either the support pin 803 or the distance between the support pin 803 and the light source 802 is designed to reduce or to prevent support pin shadow mura.

According to the abovementioned analysis, when the result of calculation is h−h'≥0, the support pin 803 which receives one tenth of the maximum luminous intensity from the light source 802 is made of transparent materials, or is made of transparent and opaque materials. When the result of calculation is h−h'<0, the support pin 803 is made of opaque materials, or is made of transparent materials. Based on the spirit of the present invention, as least two embodiments are derived as follows:

(M) At least one support pin 803 is made of first transparent materials, or is made of top and bottom connected second transparent materials and opaque materials.

If the result of calculation shows h−h'≥0, a corresponding support pin 803 is made of the first transparent materials, or is made of top and bottom connected second transparent materials and opaque materials. At least one corresponding support pin 803 is required.

If the at least one support pin 803 is made of top and bottom connected second transparent materials and opaque materials, the length of the second transparent materials is $$D \geq h - \frac{S}{\tan \theta}$$

where D indicates the length of the second transparent materials, h indicates the length of the at least one support pin 803. S indicates the distance between the at least one support pin 803 and the light source 802 closest to the at least one support pin 803, indicates an angle of incidence of a determined light beam emitted by the light source 802 with respect to the at least one support pin 803 when the determined light beam is transmitted into the at least one support pin 803. It is notified that, the intensity of the determined light beam is one tenth of the maximum luminous intensity from the light source 802.

The first transparent materials or the second transparent materials could be any arbitrary transparent materials. When the diameter of the at least one support pin 803 is longer, the transmittance of the first or the second transparent materials is higher. For example, if the diameter of the first or the second transparent materials is equal to 1 mm, a total light transmittance is higher than 5%. When light emitted by the light source 802 shines on the at least one support pin 803, the light could pass through the first or the second transparent materials, which could effectively prevent support pin shadow mum.

In the present embodiment, except for the support pin 803 made of transparent materials according to the above-mentioned design, any support pin 803 which would not cause support pin shadow mura could be made of either opaque materials or transparent materials. In other words, as long as the support pin 803 satisfies h−h'<0 or S≥h*tan θ, the support pin 803 could be made of either opaque materials or transparent materials. As can be seen, there are two possibilities for the materials of the support pin 803 in the present embodiment. One is that, all of the support pins 803 are made of transparent materials. The other is that, some of the support pins 803 are, made of transparent materials and the other of the support pins 803 are made of opaque materials.

(N) All of the support pins 803 are made of opaque materials. But, the support pins 803 closest to the light source 802 have to satisfy S≥h*tan θ. In other words, no support pins 803 are disposed around the light source 802 within a certain scope.

The distance S between the light source 802 and any of the support pins 803 closest to the light source 802 is designed to be larger than h*tan θ where the support pins 803 could be made of any arbitrary materials; for instance, at least another one of the support pins 803 is made of opaque materials. A corresponding formula, $$\frac{S}{\tan \theta} \geq h,$$

stands where h indicates the length of the at least another one of the support pins 803, S indicates the distance between the at least another one of the support pins 803 and the light source 802 closest to the at least another one of the support pins 803, θ indicates an angle of incidence of a determined light beam emitted by the light source 802 with respect to the at least another one of the support pins 803 when the determined light beam is transmitted into the at least another one of the support pins 803. The intensity of the determined light beam is one tenth of the maximum luminous intensity from the light source 802.

Moreover, referring to FIG. 6, the direct-light type backlight module of the present invention further comprises a reflector sheet 805 and an optical film 806. The reflector sheet 805, disposed between the light source 802 and the base frame 801, is used for reflecting light emitted downwards by the light source 802 to the diffuser plate 804 so as to enhance utilization of light. The optical film 806, disposed on the diffuser plate 804, is used for harmonizing light emitted from the diffuser plate 804 and adjusting an alignment of the light beam so as to enhance the brightness of light.

Preferably, the light source in the present embodiment is an LED for scattering light as a batwing-like pattern.

Furthermore, an LCD is provided by the present invention. The LCD comprises the direct-light type backlight module presented in any of the above-mentioned embodiments.

In conclusion, at least one of the support pins 803 in the direct-light type backlight module is made of the first transparent materials, or is made of top and bottom connected second transparent materials and opaque materials. Light emitted by the light source 802 could pass through the first or the second transparent materials when it shines on the at least one of the support pins 803. Or, the distance S between the light source 802 and any of the support pins 803 closest to the light source 802 is designed to be larger than a predetermined distance. Both of the methods can effectively prevent support pin shadow mura and enhance the backlight effect and the display effect.

While the present invention has been described in connection with what is considered the most practical and preferred embodiments, it is understood that this invention is not limited to the disclosed embodiments but is intended to cover various arrangements made without departing from the scope of the broadest interpretation of the appended claims.

What is claimed is:

1. A direct-light type backlight module, comprising:
   a base frame;
   a light source, disposed on the base frame and configured with LED arranged in batwing-like pattern;
   a diffuser plate, disposed on the light source;
   a plurality of support pins disposed on the base frame, for supporting the diffuser plate, a distance S between the plurality of support pins closest to the light source and the light source having to satisfy a formula as follows: S≥h*tan θ;
   where h indicates a length of the plurality of support pins closest to the light source, θ indicates an angle of incidence of a determined light beam emitted by the light source with respect to the plurality of support pins when the determined light beam is transmitted into the plurality of support pins, and an intensity of the determined light beam is one tenth of a maximum luminous intensity from the light source.

2. The direct-light type backlight module as claimed in claim 1, wherein the plurality of support pins are made of transparent materials.

3. The direct-light type backlight module as claimed in claim 1, wherein the plurality of support pins are made of opaque materials.

4. The direct-light type backlight module as claimed in claim 1, wherein some of the plurality of support pins are made of opaque materials, and some of the plurality of support pins are made of transparent materials.

5. The direct-light type backlight module as claimed in claim 1 further comprising a reflector sheet disposed between the light source and the base frame and an optical film disposed on the diffuser plate.

\* \* \* \* \*